US012679527B2

(12) United States Patent
Krzywon

(10) Patent No.: US 12,679,527 B2
(45) Date of Patent: Jul. 14, 2026

(54) CONTROLLING RATE OF ROTOR FEATHER BY SYSTEM SECONDARY TO PRIMARY BLADE ANGLE CONTROL SYSTEM

(71) Applicant: Pratt & Whitney Canada Corp., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 158 days.

(21) Appl. No.: 18/091,581

(22) Filed: Dec. 30, 2022

(65) Prior Publication Data

US 2024/0217649 A1 Jul. 4, 2024

(51) Int. Cl.
| | |
|---|---|
| *B64C 11/38* | (2006.01) |
| *B64C 11/40* | (2006.01) |
| *F01D 7/00* | (2006.01) |
| *F15B 13/04* | (2006.01) |
| *F15B 21/00* | (2006.01) |

(52) U.S. Cl.
CPC ............ *B64C 11/385* (2013.01); *B64C 11/40* (2013.01); *F01D 7/00* (2013.01); *F15B 13/04* (2013.01); *F15B 21/005* (2013.01); *F05D 2260/75* (2013.01)

(58) Field of Classification Search
CPC ...... F01D 7/00; F05D 2260/15; F15B 21/005; B64C 11/385; B64C 11/40
See application file for complete search history.

(56) References Cited

U.S. PATENT DOCUMENTS

| | | | | |
|---|---|---|---|---|
| 2,840,171 | A * | 6/1958 | Jedrziewski .......... | B64C 11/385 |
| | | | | 416/47 |
| 5,037,271 | A * | 8/1991 | Duchesneau ........... | B64C 11/38 |
| | | | | 416/157 R |
| 5,042,966 | A | 8/1991 | Schwartz et al. | |
| 9,169,783 | B2 | 10/2015 | Kleckler et al. | |
| 11,059,567 | B2 | 7/2021 | Des Roches-Dionne et al. | |
| 11,519,346 | B2 | 12/2022 | Cervelli et al. | |
| 11,958,589 | B1 * | 4/2024 | Krzywon ................ | B64C 11/40 |
| 11,982,190 | B2 * | 5/2024 | Krzywon .................. | F01D 7/00 |

(Continued)

FOREIGN PATENT DOCUMENTS

GB 724855 2/1955

*Primary Examiner* — Nathaniel E Wiehe
*Assistant Examiner* — Aye S Htay
(74) *Attorney, Agent, or Firm* — NORTON ROSE FULBRIGHT CANADA LLP

(57) ABSTRACT

The rotor control system includes a main control valve having an inlet for receiving liquid and an outlet for issuing liquid to a rotor pitch change actuator. The rotor control unit is configured to control flow of liquid from the inlet to the outlet to modify pitch angle of rotor blades. A feathering system with a first conduit connected in fluid communication with the outlet of the main control valve, a second conduit for fluid communication with the rotor pitch change actuator, and a drain conduit. The feathering system has a normal operation mode for supplying liquid from the main control valve to the rotor pitch change actuator by allowing flow through the feathering system from the first conduit to the second conduit. The feathering system has a feathering mode for controlling drainage from the rotor pitch change actuator to the drain conduit.

10 Claims, 2 Drawing Sheets

(56)                References Cited

U.S. PATENT DOCUMENTS

| | | | |
|---|---|---|---|
| 2010/0014972 A1* | 1/2010 | Steffensen | F03D 7/0264 |
| | | | 416/31 |
| 2017/0361919 A1 | 12/2017 | Waddleton | |
| 2018/0072402 A1* | 3/2018 | Waddleton | B64C 11/40 |
| 2019/0031319 A1* | 1/2019 | Calkins | B64C 11/40 |
| 2020/0189721 A1 | 6/2020 | Maver et al. | |
| 2020/0298959 A1 | 9/2020 | Castellani et al. | |
| 2021/0079855 A1 | 3/2021 | Cervelli et al. | |
| 2021/0164403 A1* | 6/2021 | Krzywon | B64C 11/38 |
| 2022/0030772 A1* | 2/2022 | Wallestad | F04B 19/04 |
| 2022/0340260 A1 | 10/2022 | Krzywon | |

* cited by examiner

CONTROLLING RATE OF ROTOR FEATHER BY SYSTEM SECONDARY TO PRIMARY BLADE ANGLE CONTROL SYSTEM

BACKGROUND

1. Field

The present disclosure relates to controlling air movers, and more particularly to controlling blade angles in propellers.

2. Description of Related Art

Propeller-driven aircraft often incorporate a protection feature that commands the propeller into the feather position to preclude an unsafe event such as uncontrolled propeller acceleration or inadvertent propeller transition into an undesired range of blade angles. Activation of the protective propeller feather function is usually performed abruptly in reaction to the detected unsafe conditions to quickly prevent continuing to operate in a state that may result in an imminent hazardous or catastrophic flight safety event.

However, for a hydraulically-actuated propeller, sudden maximum drainage via a feather valve may introduce a sudden change to the acting forces on an airplane and affect its controllability if the propeller quickly transitions from a state of high thrust and low aircraft rolling momentum to a state of zero thrust and significant aircraft rolling momentum, in addition to significant loads to engine and aircraft structures. Following confirmation that the unsafe state was prevented but prior to completely feathering the propeller, maximum drainage flow may not always be necessary.

The conventional techniques have been considered satisfactory for their intended purpose. However, there is an ever present need for improved systems and methods for controlling protective propeller feather functions. This disclosure provides a solution for this need.

SUMMARY

The rotor, e.g. propeller, control system includes a main control valve having an inlet for receiving liquid and an outlet for issuing liquid to a rotor pitch change actuator. The rotor control unit is configured to control flow of liquid from the inlet to the outlet to modify pitch angle of rotor blades. A feathering system with a first conduit connected in fluid communication with the outlet of the main control valve, a second conduit for fluid communication with the rotor pitch change actuator, and a drain conduit. The feathering system has a normal operation mode for supplying liquid from the main control valve to the rotor pitch change actuator by allowing flow through the feathering system from the first conduit to the second conduit. The feathering system has a feathering mode for allowing drainage from the rotor pitch change actuator to the drain conduit by connecting the second conduit in fluid communication with the drain conduit for drainage from the drain conduit to an engine oil return system. The feathering system is configured to reduce rate of draining in the drain conduit during the feathering mode.

The feathering system can include a feather valve in fluid communication with the first conduit, with the second conduit, and with the drain conduit to selectively either place the second conduit in fluid communication with the first conduit or with the drain conduit. A feather solenoid can be operatively connected to control a piston of the feather valve for actuating the feather valve between connecting the second conduit in fluid communication with either the first conduit or with the drain conduit. The feather solenoid can be in fluid communication with the drain conduit through a branch of the drain conduit. A feather drain control valve can be included in the drain conduit or second line either upstream or downstream of the feather valve and feather solenoid for control of flow in the drain conduit during the feathering mode.

The feather drain control valve can be an open/close valve configured to selectively either allow or block flow through the drain conduit. The feather drain control valve can be an actively controlled metering valve, configured to open, moderate, and close flow through the drain conduit under active control in the feathering mode. The feather drain control valve can be a passively controlled metering valve, configured to passively meter flow in through the drain conduit in the feathering mode.

A controller can be operatively connected to control the feathering system in the feathering mode. The controller includes machine readable instructions configured to cause the controller to perform methods as disclosed herein.

A method of controlling rotor blade angle includes receiving input indicative of a need to feather a rotor pitch angle actuator, commanding a feathering system to switch to a feathering mode to drain the rotor pitch angle actuator to feather a rotor, commanding the feathering system to drain the rotor pitch angle actuator at a fully open drain flow rate initially, and receiving input indicative of exiting the need to feather. After receiving the input indicative of exiting the need to feather, the method includes commanding the feathering system to control drainage by at least one of:

modulating drainage from the rotor pitch angle actuator somewhere in the range between fully open flow and fully closing off flow from the second conduit to the drain conduit; or completely blocking drainage from the rotor pitch angle actuator with a binary open/closed mechanism.

Controlling drainage can include stopping flow through the drain conduit under either active or passive control. Modulating drainage can include gradually reducing rate of oil drain from the second conduit to the drain conduit, wherein gradually reducing rate of oil drain is performed under active control. Modulating drainage can include gradually reducing rate of oil drain from the second conduit to the drain conduit, wherein gradually reducing rate of oil drain is performed under passive control. Modulating drainage can include after gradually reducing rate of oil drain, fully closing off flow draining the rotor pitch angle actuator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2:
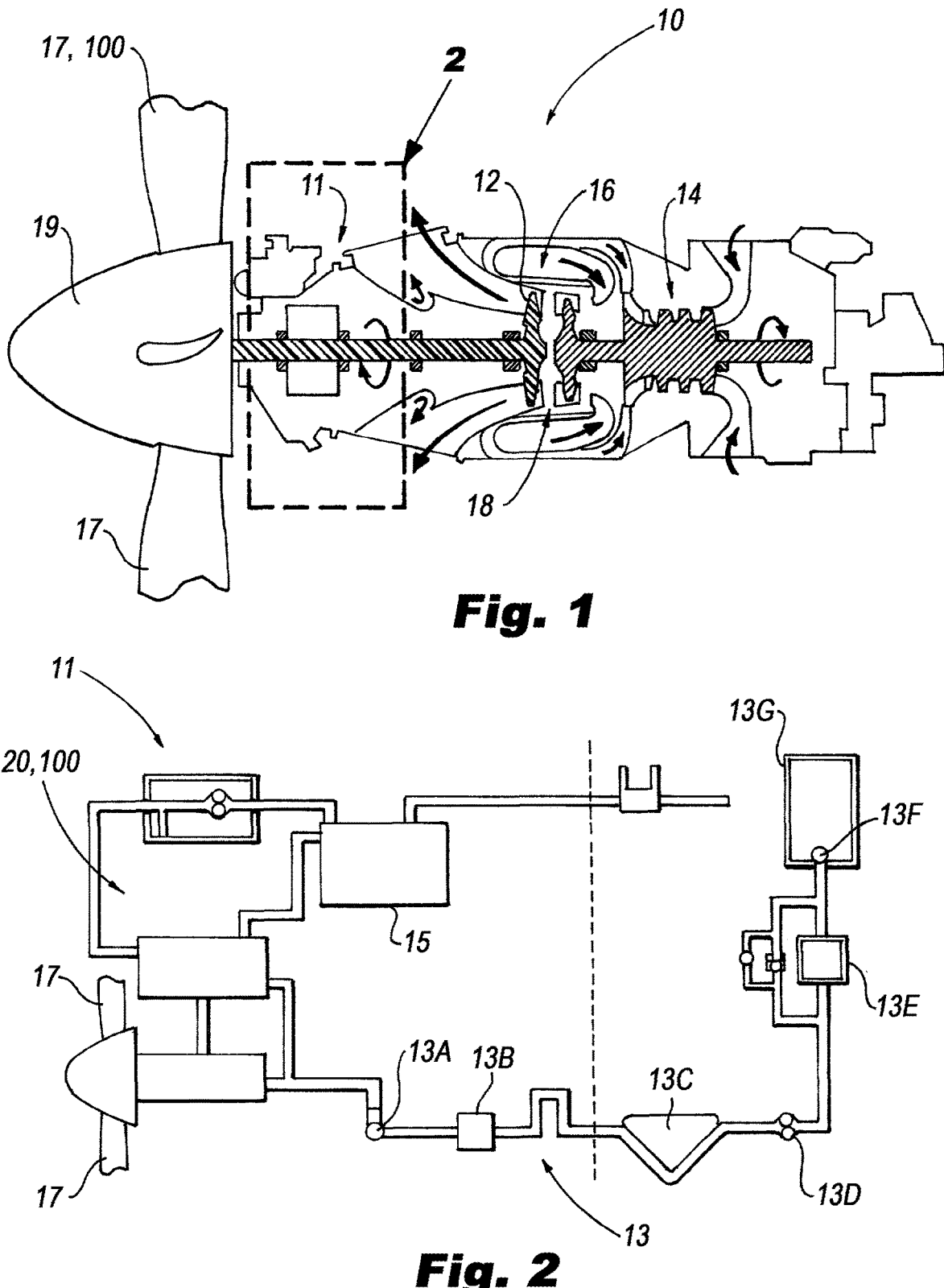
FIG. 1 is a schematic cross-sectional view of a gas turbine engine.
FIG. 2 is a schematic view of an oil system for the gas turbine engine of FIG. 1, the oil system having a propeller blade angle control system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to control the drainage from a feathering system after a propeller feathering event to avoid over correcting.

FIG. 1 illustrates a gas turbine engine 10 of a type for use in subsonic flight, generally comprising in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. A low pressure (LP) turbine 12 drives, via a reduction gear box (RGB), a propeller 19 having propeller blades 17 for providing thrust to the aircraft. An oil system 11 is provided for the gas turbine engine 10, and provides lubrication for the rotating components of the gas turbine engine 10, which include bearings for the rotating turbomachinery (e.g. the compressors, turbines, shafts, and gears), the RGB and the propeller control systems, etc.

Referring to FIG. 2, the oil system 11 can include any number of components, and any arrangement of components, to provide lubrication to the gas turbine engine 10 of FIG. 1. One such component, an engine oil return system 13, is shown in the depicted embodiment. The engine oil return system 13 receives used or scavenged oil from the lubricated components of the gas turbine engine, filters and cools the reclaimed oil, and pressurizes it for recirculation to the rotating turbomachinery. In the depicted embodiment, the engine oil return system 13 includes a chip detector 13A to detect the presence of unacceptably-large debris in the oil returning from the propeller 19. The oil and any debris is then filtered with a screen 13B, and then subjected to anti-icing procedures at an anti-icing station 13C. A scavenge pump 13D pressurizes the oil and sends it through another filter 13E before passing through another chip detector 13F before being collected in a main oil tank 13G. From the main oil tank 13G, the oil can be pumped with a supply pump to any number of different components of the oil system 11. For example, oil can be pumped from the supply pump to an auxiliary oil tank 15. The engine oil return system 13 can have more, fewer, and/or different components than those schematically depicted or described above.

In the depicted embodiment, the auxiliary oil tank 15 serves as a source of oil for a rotor, e.g. propeller, blade angle control circuit 20. The oil supplied to the propeller blade angle control circuit 20 (or "control circuit 20") provides hydraulic power to the propeller control circuit 20, allowing it to control the pitch of the variable-pitch propeller blades 17. The control circuit 20 is thus integrated with, and supplied by, the oil system 11. By being integrated with the oil system 11 of the gas turbine engine, the control circuit 20 is able to use the oil provided by oil system 11 to control the pitch of the propeller blades 17. The oil of the oil system 11 therefore provides a lubricating function, and an actuating function by providing hydraulic power.

Figure 3:
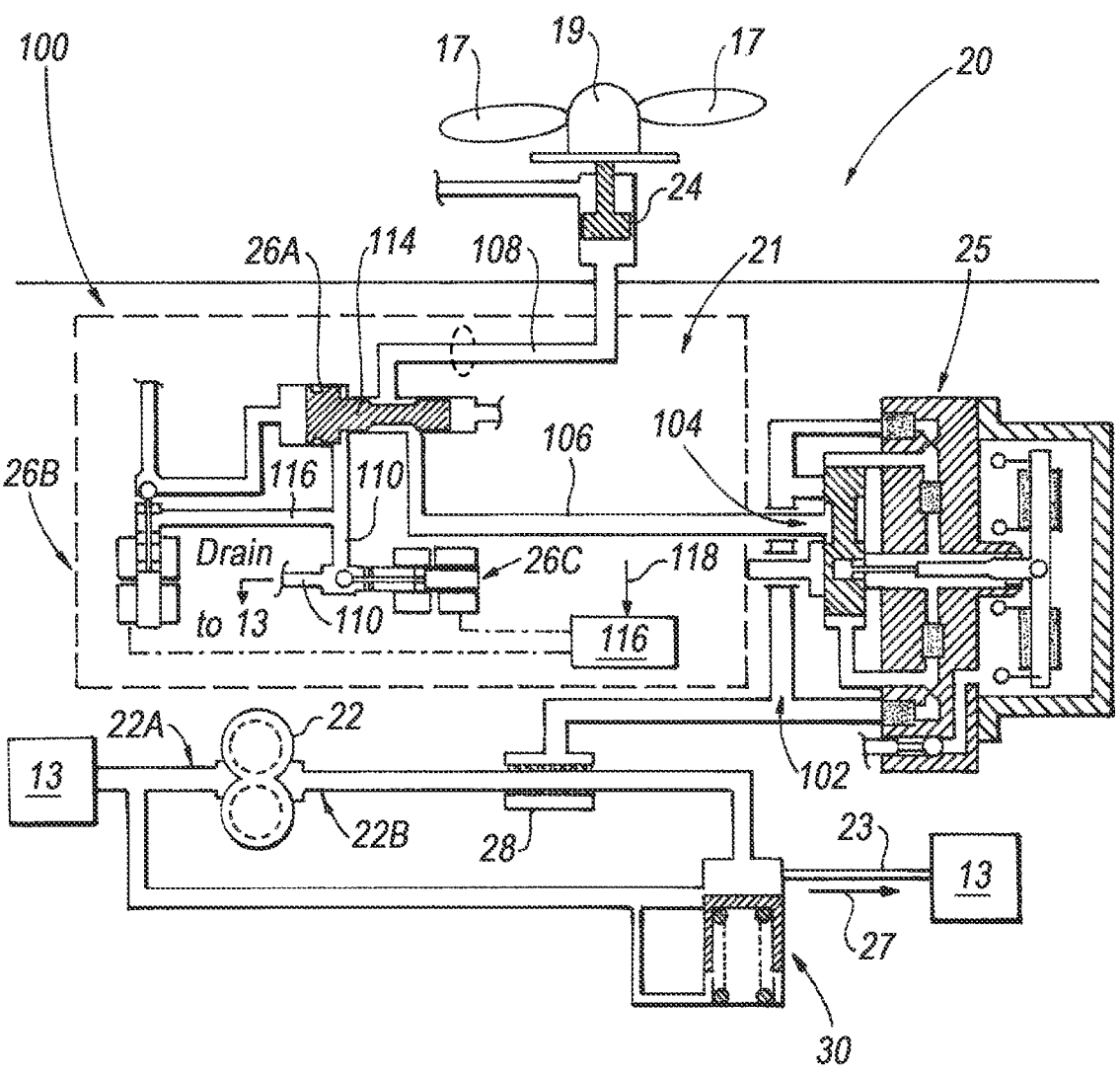
FIG. 3 is a schematic view of the propeller blade angle control system of FIG. 2, showing the feathering system.

The control circuit 20 is an assembly of fluid lines or conduits, connectors, valves, and other components that supply oil to the mechanisms that change the pitch of the propeller blades 17. In the embodiment of FIG. 3, the control circuit 20 has a propeller control unit 21 to effect changes in the pitch of the propeller blades 17, a fixed-displacement pump 22 which provides oil to the propeller control unit or system 21, an oil cooling conduit 23 which helps to divert excess oil to the engine oil return system 13, and a flow regulator 30 which modulates to the flow of oil.

The propeller control unit 21 modulates the supply of oil that is used to modify the angle of the propeller blades 17. It can thus have any suitable component, and any suitable arrangement of components, to achieve this functionality. More particularly, the propeller control unit 21 may include different actuators, valves, and other components to adjust the angle of the propeller blades 17. In the depicted embodiment, the propeller control unit 21 has a propeller pitch change actuator 24 which can effect fine and coarse changes in propeller blade 17 pitch. The propeller control unit 21 also has a servo valve 25 which controls the pressure of the oil supplied to the pitch change actuator 24.

The propeller control unit 21 included a feathering system 100, which includes a feather valve 26A supplied with oil by the servo valve 25, and a feather solenoid 26B. The feathering system also includes a feather drain control valve 26C. The propeller control unit 21 can have more, fewer, and/or different components than those depicted or described above.

The fixed-displacement pump 22 outputs a substantially constant flow rate of oil to the propeller control unit 21. The pump 22 is therefore located within the control circuit 20 upstream of the propeller control unit 21, and acts as a dedicated source of constant hydraulic power. It is typically sized to provide sufficient hydraulic power to satisfy the largest loads of the propeller control unit 21. The pump 22 is supplied with oil from a component of the oil system 11, such as from the engine oil return system 13.

Still referring to FIG. 3, the oil cooling conduit 23 is a return conduit which sends excess oil from the pump 22 to the engine oil return system 13. The oil cooling conduit 23 can therefore be any hose, tube, pipe, or other similar conduit that extends from an outlet 22B of the pump 22 to the engine oil return system 13. It will be appreciated that the oil cooling conduit 23 may be physically spaced from the outlet 22B of the pump 22 provided that it is fluid communication therewith to receive oil therefrom.

In allowing excess oil to be diverted away from the pump 22 and propeller control unit 21, the oil cooling conduit 23 defines a leakage path 27 that leads to the engine oil return system 13. "Excess" oil is oil that is supplied by the fixed-displacement pump 22 but that is not required by the propeller control unit 21. Excess oil is typically available during steady-state operation of the propeller 19 (e.g. flight idle, ground idle, etc.), when there is no need to change the pitch of the propeller blades 17. Rather than returning this relatively hot excess oil to an inlet 22A of the pump 22, as is done in some conventional blade angle control systems, the oil cooling conduit 23 allows the excess oil to be diverted, directly or indirectly, to the engine oil return system 13 where it can be cooled using any of the techniques used to cool the oil being returned from other parts of the oil system 11 (e.g. air-oil heat exchanger, fuel-oil heat exchanger, circulation, etc.). The oil cooling conduit 23 therefore helps to divert hot oil away from the pump 22, thereby reducing the likelihood of damage to the pump 22 caused by overheating. For example, it is known that relative hot oil (i.e. in excess of 275° F.) may exceed the temperature limits of some of the elastomers used in seals for the pump 22, or of the coils in valves of the pump 22. Those skilled in the art will readily appreciate that not every propeller control unit (PCU) design requires oil cooling, and that oil cooling can be omitted if suitable for a given application without departing from the scope of this disclosure.

Still referring to FIG. 3, the flow regulator 30 governs the amount of oil that is leaked along the leakage path 27 to the engine oil return system 13. The flow regulator 30 is located between the pump 22 and the propeller control unit 21. In the depicted embodiment, the flow regulator 30 is shown downstream of the pump 22, downstream of a wash screen 28, and upstream of the servo valve 25 of the propeller control unit 21. Other configurations are possible. The flow regulator 30 is fluidly connected to the oil cooling conduit 23, and is operable between an open position and a closed position to selectively allow access to or block, respectively, the leakage path 27 defined by the oil cooling conduit 23 that leads to the engine oil return system 13. It is to be noted that the oil cooling conduit 23 even though is considered herein as providing a path for oil return for oil cooling purpose, on certain applications may be used for other purposes, e.g., for the valve 30 to be able to drain the excessive oil from the PCU over the optimal for the PCU EHSV operation, therefore allows the PRV to maintain optimal oil flow at the inlet to the PCU EHSV.

In the open position, the flow regulator 30 allows access to the leakage path 27 and directs oil through the oil cooling conduit 23 and along the leakage path 27 toward the engine oil return system 13 so that the oil can be cooled. In this position, where oil is diverted along the leakage path 27, the flow regulator 30 is regulating the pressure of the oil supplied to the propeller control unit 21 and diverting excess oil toward the engine oil return system 13. The flow regulator 30 will typically, but not exclusively, operate in the open position during steady-state operation of the propeller 19. During steady-state operation, there is less of a demand from the pitch change actuator 24 responsible for changing the angle of the propeller blades 17. Therefore, "steady-state" refers to relatively little or no demand for hydraulic power from the downstream propeller control unit 21. A cooling oil flow diversion can thus be provided by the flow regulator 30 during steady-state operation.

In the closed position, the flow regulator 30 blocks access to the leakage path 27. Oil is thus instead directed entirely toward the propeller control unit 21 to effect changes in the angle of the propeller blades 17. In this position, where oil is prevented from being diverted along the leakage path 27, substantially all of the hydraulic power supplied by the pump 22 is available for the propeller control unit 21 to make the required changes in propeller blade 17 pitch. This is in contrast to some conventional blade angle control systems, which allow leaking flow back to the engine oil return even during high load maneuvers. The flow regulator 30 will typically, but not exclusively, operate in the closed position during transient operation of the propeller 19. During transient operation, there is a relatively high demand for hydraulic power. Some examples of transient flow regimes include accommodating for large changes in engine power, moving the engine into or out of reverse, or feathering or unfeathering the propeller 19. Therefore, "transient" refers to relatively high demand for hydraulic power from the downstream propeller control unit 21.

The propeller control unit 21 includes a main control valve, e.g. servo valve 25, having an inlet 102 for receiving liquid and an outlet 104 for issuing liquid to the propeller pitch change actuator 24. The propeller control unit 21 is configured to control flow of liquid from the inlet 102 to the outlet 104 to modify pitch angle of propeller blades 17. A feathering system 100 with a first conduit 106 connected in fluid communication with the outlet 104 of the main control valve 25, a second conduit 108 for fluid communication with the propeller pitch change actuator 24, and a drain conduit 110. The feathering system 100 has a normal operation mode for supplying liquid from the main control valve 25 to the propeller pitch change actuator 24 by allowing flow through the feathering system 100 from the first conduit 106 to the second conduit 108. The feathering system 100 has a feathering mode for allowing drainage from the propeller pitch change actuator 24 to the drain conduit 110 by connecting the second conduit 108 in fluid communication with the drain conduit 110. The feathering system 100 is configured to reduce rate of draining in the drain conduit 110 during the feathering mode. Liquid can drain from the drain conduit 110 to the engine oil return system 13. For example, the drain line 110 from feather valve 26A can be just a passage in the housing, which is drained through PCU and then through a reduction gear box (RGB in FIG. 1), so the drained oil from feather valve just goes to the RGB reservoir (e.g. tanks 13G or 15 of the oil return system 13 in FIG. 2).

The feathering system 100 includes a feather valve 26A in fluid communication with the first conduit 106, with the second conduit 108, and with the drain conduit 110 to selectively either place the second conduit 108 in fluid communication with the first conduit 106 or with the drain conduit 110. A feather solenoid 26B is operatively connected to control a piston 114 of the feather valve 26A for actuating the feather valve 26A between connecting the second conduit 108 in fluid communication with either the first conduit 106 or with the drain conduit 110. The feather solenoid 26B is in fluid communication with the drain conduit 110 through a branch 116 of the drain conduit 110. A feather drain control valve 26C is included in the drain conduit 110 downstream of the feather valve 26A and feather solenoid 26B for control of flow in the drain conduit 110 during the feathering mode. It is also contemplated that the feather drain control valve 26C can instead be located in the second line 108 upstream of the feather valve 26A, as indicated by the dashed line circle in FIG. 3.

The feather drain control valve 26C is an open/close valve configured to selectively either allow or block flow through the drain conduit 110 and second conduit 108 in the feathering mode. However, it is also contemplated that the feather drain control valve 26C can instead be metering valve, configured to open, moderate, and close flow through the drain conduit 110 under active control in the feathering mode. The feather drain control valve can either be a passively or actively controlled metering valve, configured to meter flow in through the drain conduit in the feathering mode in a valve state moderating somewhere between fully open and fully closed.

A controller 116 is operatively connected to control the feathering system 100 in the feathering mode, including connections indicated by broken lines in FIG. 3 for actively controlling the feather solenoid 26B and the feather drain control valve 26C in actively controlled embodiments. The controller 116 includes machine readable instructions configured to cause the controller 116 to perform methods as disclosed herein.

A method of controlling propeller blade angle includes receiving input 118 indicative of a need to feather a propeller pitch angle actuator 24, commanding a feathering system 100 to switch to a feathering mode to drain the propeller pitch angle actuator 24 to feather a blades 17 of a propeller, commanding the feathering system 100 to drain the propeller pitch angle actuator 24 at a fully open drain flow rate initially, and receiving input 118 indicative of exiting the need to feather. After receiving the input 118 indicative of exiting the need to feather, the method includes commanding the feathering system 100 to control drainage, e.g. in the drain line 110, by at least one of modulating drainage from the propeller pitch angle actuator 24 somewhere in the range between fully open flow and fully closing off flow from the second conduit to the drain conduit, or completely blocking drainage from the propeller pitch angle actuator 24 with a binary open/closed mechanism, depending on whether the feather drain control valve 26C is a metering valve or an on/off type valve.

Controlling drainage includes stopping flow through the drain conduit 110 under either active or passive control. Modulating drainage can include gradually reducing the rate of oil drain from the second conduit 108 to the drain conduit 110, wherein gradually reducing rate of oil drain is performed under active or passive control. Modulating drainage can include, after gradually reducing rate of oil drain, fully closing off flow draining the propeller pitch angle actuator. This can prevent overcorrection when correcting conditions that call for feathering have abated, and can reduce the time needed to return to the normal mode of operation with normal control of propeller blade angles.

This disclosure provides a secondary system, which is be activated only after the main feathering valve 26A is commanded to fully open, and after the undesired state in no longer present. The undesired state can include over speed, undesired blade angle, and the like. Activation of the secondary system, e.g. the feather drain control valve 26C, reduces the rate of oil drained through the primary oil drain system by restricting the flow being discharged by the primary protection system.

Systems and methods disclosed herein can be incorporated in applications that do not require rapidly bringing the propeller into the fully feathered position, but rather exiting an undesired state that may be achieved prior to full-feathering, and for which abrupt movement to full-feather may result in other undesired consequences such as sudden rolling forces induced on the aircraft or sudden loss of thrust.

The secondary system, e.g. feather drain control valve 26C can be de-activated if any of the conditions are met: the system reenters the undesired state, and/or the primary protection feathering valve is not activated (open). The secondary protective propeller feather function may be a binary "open/closed" mechanism, such as a solenoid, or a modulating system such as an Electro-Hydraulic Servo Valve (EHSV), which may further smoothen the transition of the propeller blades into the fully feathered position after the undesired state has been rapidly mitigated by the primary protective propeller feathering system. Just like the primary protective system (e.g. feathering valve 26A and feather solenoid 26B), the secondary protective system (e.g. feather drain control valve 26C) can be electronically controlled (e.g. by the controller 116), or activated via a passive system that causes hysteresis or a time-delay/offset.

The methods and systems of the present disclosure, as described above and shown in the drawings, provide for controlling the drainage from a feathering system after a propeller feathering event to avoid over correcting. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor control system comprising:
a main control valve having an inlet for receiving liquid and an outlet for issuing liquid to a rotor pitch change actuator, wherein the main control valve is configured to control flow of the liquid from the inlet to the outlet to modify pitch angle of rotor blades;
a feathering system including a feather valve having a feather inlet, a feather port, and a drain outlet, the feather system having a first conduit fluidly connecting the outlet of the main control valve to the feather inlet, a second conduit fluidly connecting the feather port with the rotor pitch change actuator, and a drain conduit fluidly connecting the drain outlet of the feathering valve to a drain location for draining the liquid from the rotor pitch change actuator,
wherein the feathering system has a normal operation mode for supplying liquid from the main control valve to the rotor pitch change actuator by allowing flow through the feathering system from the first conduit to the second conduit, the feather valve fluidly connecting the feather inlet to the feather port while disconnecting the feather port from the drain outlet in the normal operation mode, and
wherein the feathering system has a feathering mode for allowing drainage from the rotor pitch change actuator to the drain conduit by connecting the second conduit in fluid communication conduit with the drain conduit for drainage from the drain conduit to an engine oil return system, the feather valve fluidly connecting the feather port to the drain outlet in the feathering mode,
the feathering system further including a feather drain control valve, the drain outlet of the feather valve fluidly connected to the drain location through the feather drain control valve; and
a controller operatively connected to the feather drain control valve, the controller having a processing unit operatively connected to a computer-readable medium having machine readable instructions stored thereon executable by the processing unit for:
upon the feather valve being in the feathering mode caused by an undesired state, determining that the undesired state requiring a need to feather the rotor pitch angle actuator is no longer present; and
causing the feather drain control valve to at least partially restrict a drain flow of the liquid from the feather valve to the drain location.

2. The system as recited in claim 1, wherein the machine-readable instructions include instructions configured to cause the controller to:
command the feathering system to drain the second conduit to the drain conduit at the fully open flow initially;
to receive input indicative of exiting the need to feather, commanding the feathering system to at least partially restrict the drain flow by doing at least one of:

modulate drainage from the second conduit to the drain conduit somewhere in the range between fully open flow and fully closing off flow from the second conduit to the drain conduit; or completely block drainage from the second conduit to the drain conduit with the feature drain control valve being configured as an open/close valve.

3. The system as recited in claim 2, wherein modulating drainage includes gradually reducing rate of oil drain from the second conduit to the drain conduit.

4. The system as recited in claim 3, wherein modulating drainage includes after gradually reducing rate of oil drain, fully closing off flow draining the rotor pitch angle actuator.

5. The system as recited in claim 3, wherein modulating drainage and/or completely blocking drainage is performed under active control.

6. The system as recited in claim 3, wherein modulating drainage and/or completely blocking drainage is performed under passive control.

7. The system as recited in claim 1, wherein the feathering system includes:

a feather solenoid operatively connected to control a piston of the feather valve for actuating the feather valve between connecting the second conduit in fluid communication with either the first conduit or with the drain conduit, wherein the feather solenoid is in fluid communication with the drain conduit through a branch of the drain conduit.

8. The system as recited in claim 7, wherein the feather drain control valve is an open/close valve configured to selectively either allow or block flow through the drain conduit.

9. The system as recited in claim 7, wherein the feather drain control valve is an actively controlled metering valve, configured to open, moderate, and close flow through the drain conduit under active control in the feathering mode.

10. The system as recited in claim 7, wherein the feather drain control valve is a passively controlled metering valve, configured to passively meter flow in through the drain conduit in the feathering mode.

* * * * *